United States Patent Office 2,988,931
Patented June 20, 1961

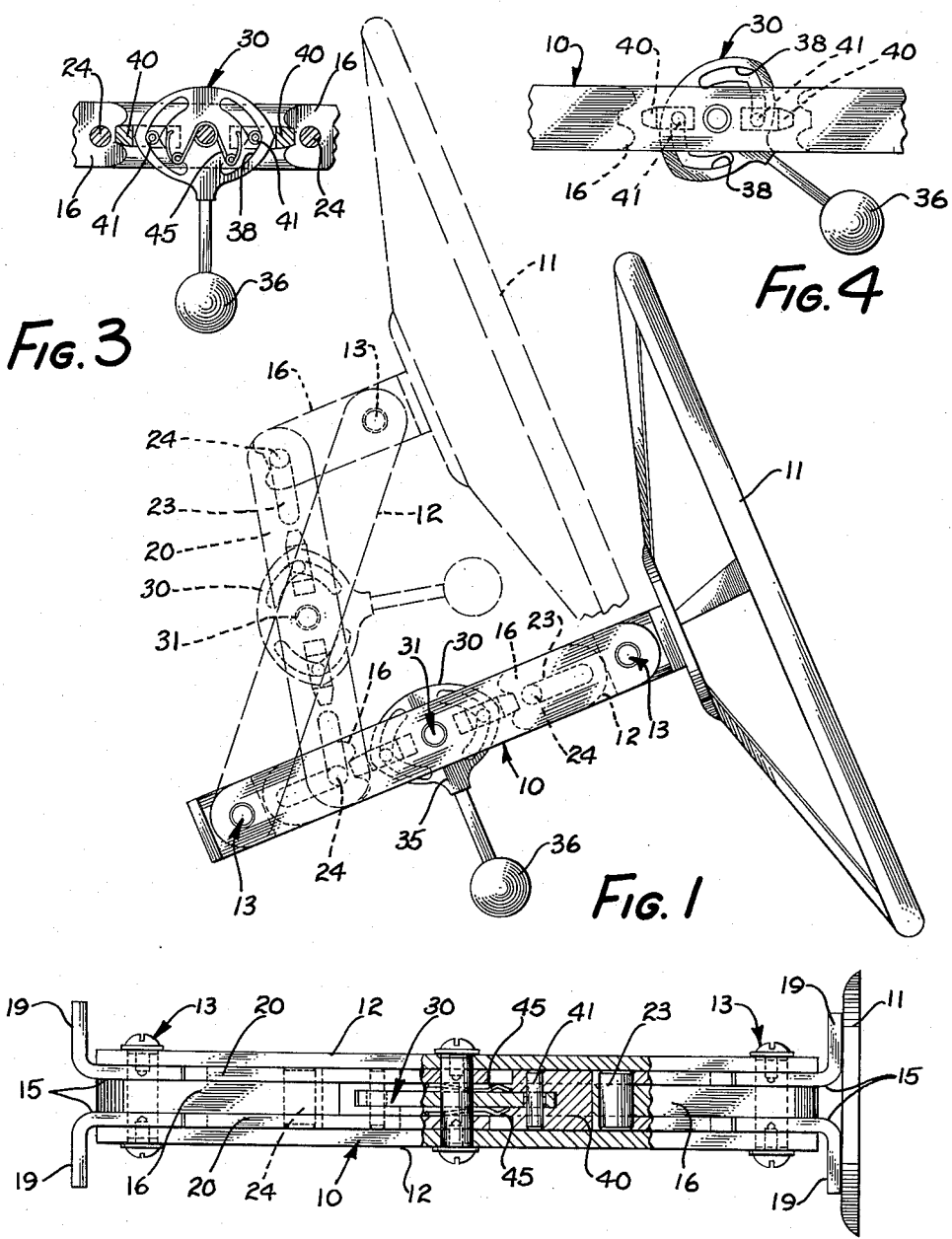

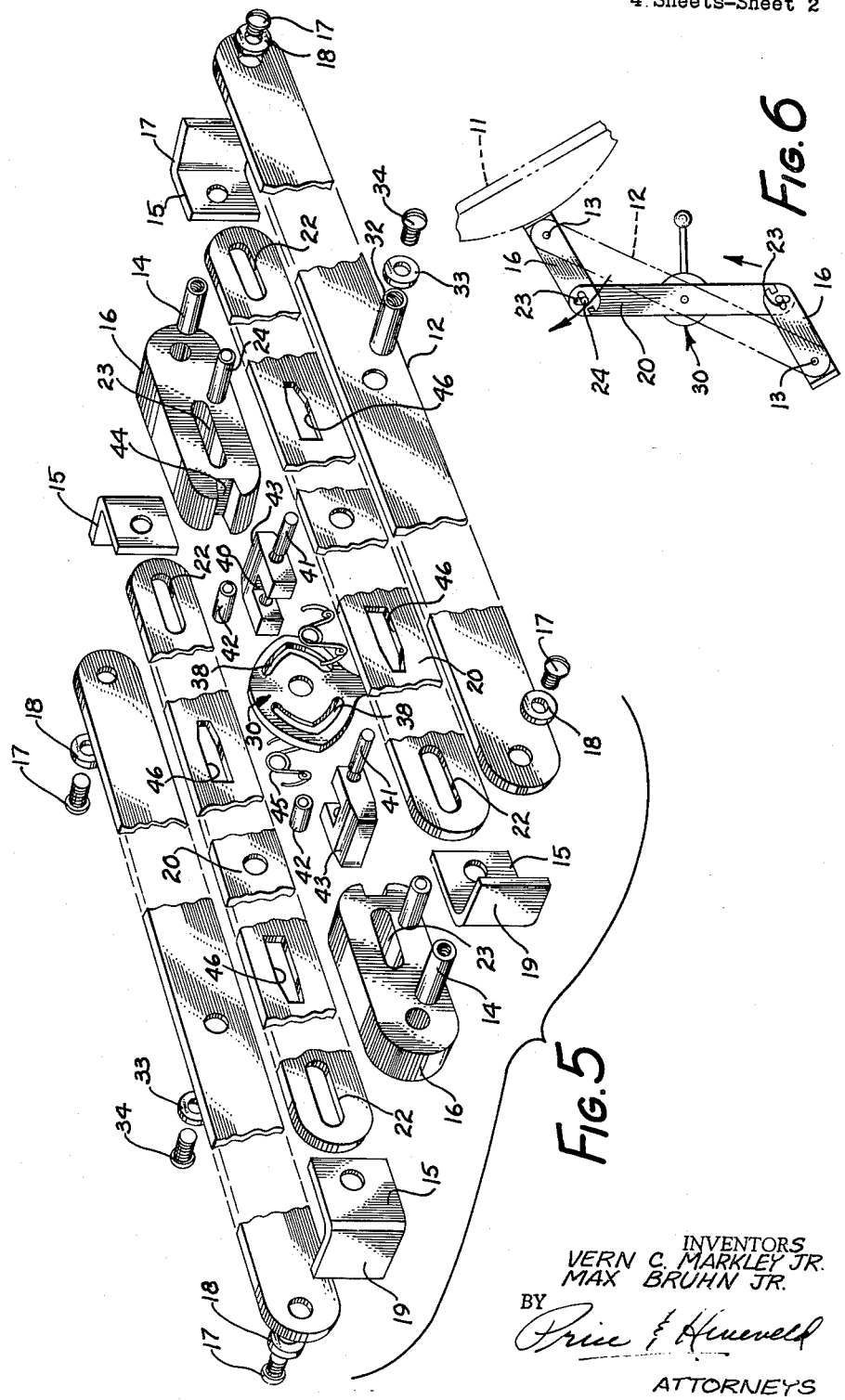

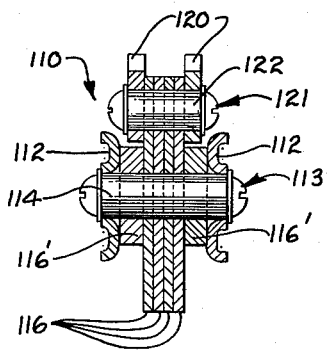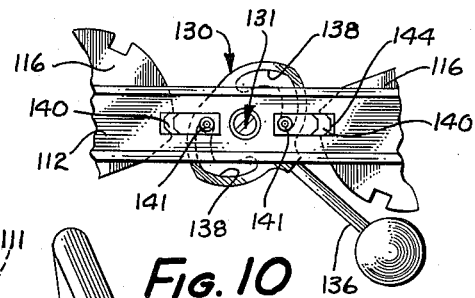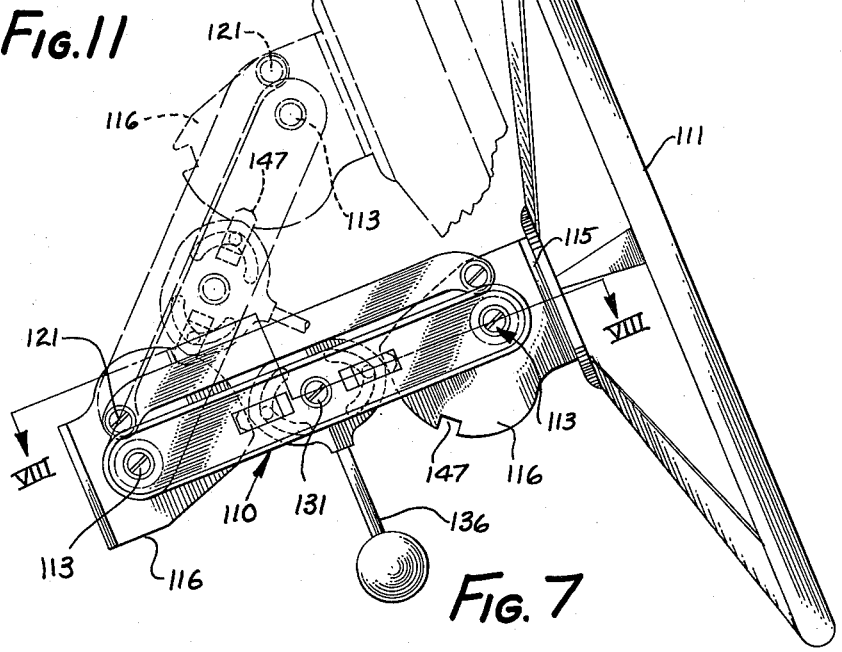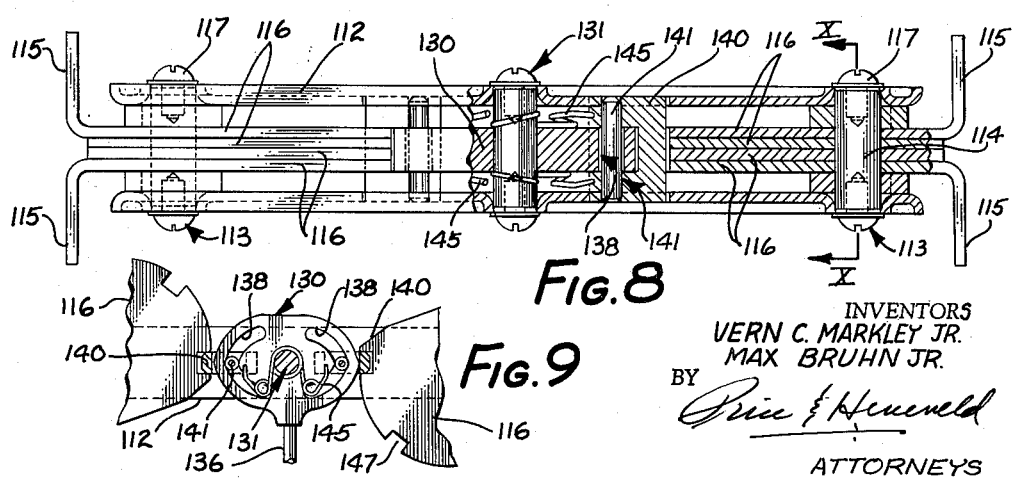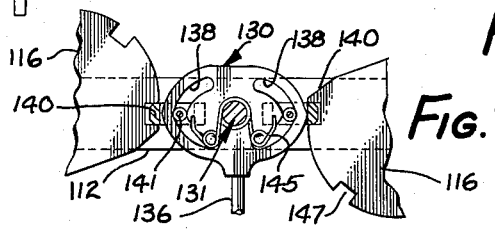

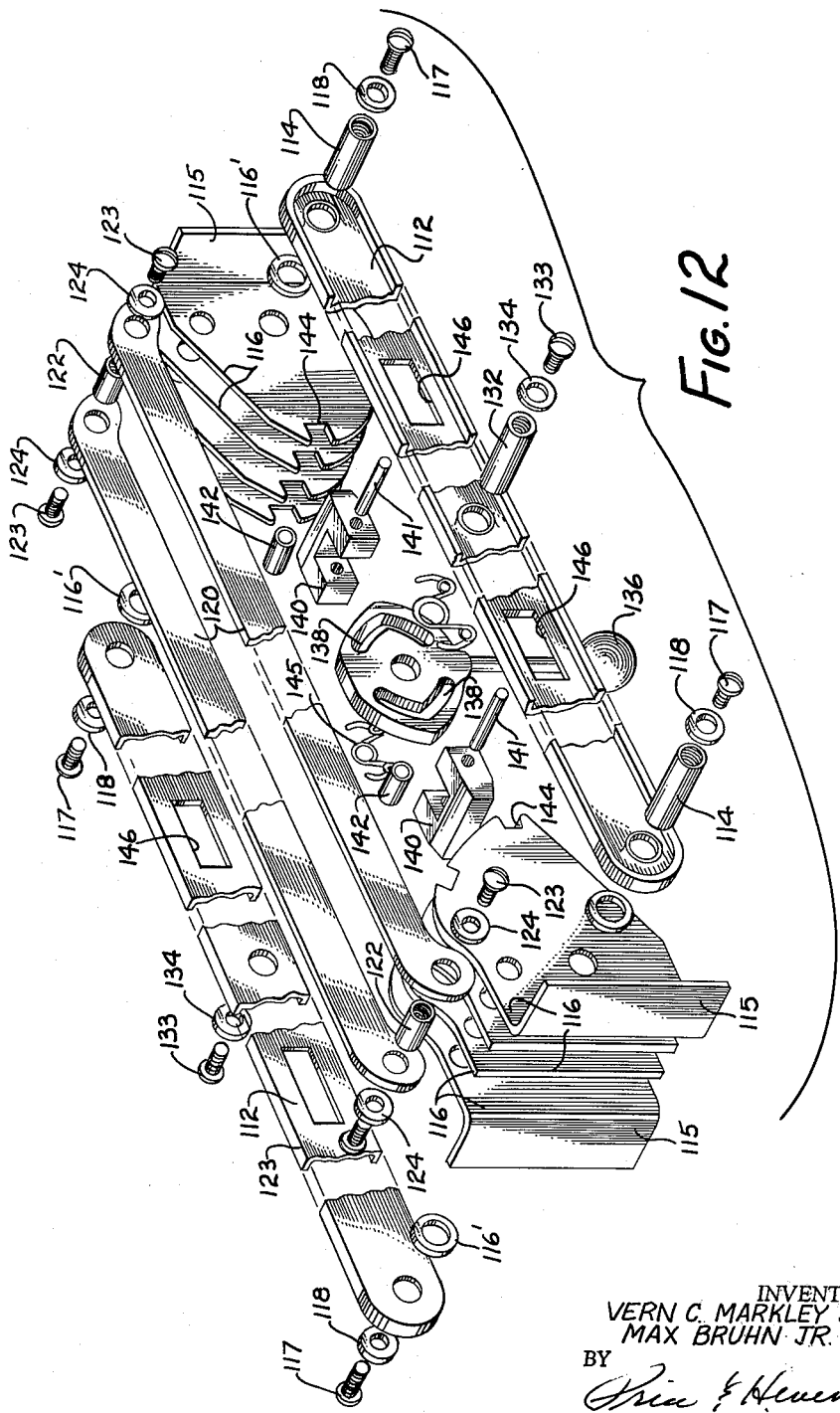

2,988,931
FOLDING STEERING COLUMN
Vern C. Markley, Jr., Grand Haven, and Max Bruhn, Jr., Spring Lake, Mich., assignors to Grand Haven Stamped Products Company, Grand Haven, Mich., a corporation of Michigan
Filed Apr. 29, 1959, Ser. No. 809,799
9 Claims. (Cl. 74—556)

This invention relates to vehicle steering means generally and more particularly to folding and retractable vehicle steering columns.

The present trend toward lower vehicle silhouettes has introduced several problems as regards getting into and out of automotive vehicles. Among these problems is the difficulty the vehicle operator experiences as regards the vehicle steering wheel.

Vehicle steering wheels must be disposed below the vehicle operator's range of vision. At the same time, they must be reasonably close to the operator for safety, convenience, and other reasons. In the newer and lower vehicles the steering wheels are required to be nearer the operator's mid-section and closer to his knees than previously. This positioning of the steering wheel, in combination with the off-balanced position required to be assumed in entering and leaving the lower vehicles causes the steering wheel to impose a serious hindrance in getting into or out of the vehicle.

Retractable forms of steering wheels and columns have been used previously in aircraft and other vehicles, but have never proven entirely acceptable for automotive use. There are serious space and expense limitations in automotive vehicles which require that any collapsible feature for the steering means be provided within the steering facility itself and preferably totally within the operator's compartment. This avoids interference with the operation of other accessory items in the vehicle engine compartment and eliminates any extensive revision of the vehicle instrument panel for each automotive model change. The steering facility must be such as is positively locked in a drive position and cannot be inadvertently collapsed or retracted. At the same time it must be readily collapsible or retractable and as easily returned and locked in a drive position. The mechanism must not be unduly complicated to operate and should include as few parts as possible for simplicity of assembly, repair, etc. The structure must be strong and durable, and yet be reasonably inexpensive to manufacture and install.

It is an object of this invention to disclose a novel form of collapsible or retractable steering wheel. This steering wheel and column arrangement is particularly adaptable for automotive use.

It is an object of this invention to disclose a vehicle steering means which is retractable within a short space immediately preceding the steering wheel itself. The retractable steering means of this invention makes use of cooperatively arranged and interlocking mechanical links which may be selectively disengaged from each other.

Another object of this invention is to disclose a collapsible or retractable vehicle steering means having positive means of actuation which otherwise serves to prevent inadvertent collapse or retraction of the steering mechanism. Accordingly, means are provided to guard against misuse of the device in the normal course of operation.

Still another object of this invention is to disclose a retractable steering wheel having means of retaining the retracted wheel in such position.

These and other objects and advantages will be more fully appreciated in the specification that follows, in conjunction with the accompanying drawings.

The drawings show two similar but different forms of this invention. The structure of drawing FIGURES 1-6 makes use of a scissor form of linkage while that of FIGURES 7-12 illustrate a parallelogram or pantograph linkage system. Both include the same general form of interlock for the straight line drive connection.

Referring to the drawings more specifically:

FIG. 1 is a side elevation view of a steering wheel and column including the features of this invention, and showing the retracted position of the mechanism in phantom outline.

FIG. 2 is an enlarged plan view of the collapsible steering column of FIG. 1, having parts broken away and shown in cross section.

FIG. 3 is a fragmentary, sectional, elevation view of the steering column lock and control mechanism in locked position.

FIG. 4 is a fragmentary, sectional, elevation view of the steering column lock showing the lock and control mechanism in unlocked position.

FIG. 5 is an exploded view of the different parts making up the retractable steering column of FIG. 1.

FIG. 6 is a fragmentary view of the steering mechanism of FIGS. 1-5 in partially retracted position.

FIG. 7 is a side elevation view of another form of retractable steering wheel and column, including the features of this invention. The steering wheel and column is shown in its retracted position in phantom outline.

FIG. 8 is an enlarged plan view of the collapsible steering column shown by FIG. 7 with parts sectioned along the plane VIII—VIII of FIG. 7.

FIG. 9 is a fragmentary, sectional, elevation view of the steering column lock and control mechanism illustrating it in locked position.

FIG. 10 is a fragmentary, side elevation view of the steering column of FIG. 7 showing the lock and control mechanism in unlocked position.

FIG. 11 is an enlarged sectional elevation view through the pivot connections at one end as indicated by the plane XI—XI of FIG. 8.

FIG. 12 is an exploded view showing the different parts of the retractable steering mechanism of FIG. 7 and their relative relationship.

The steering mechanism of FIGS 1-6 includes a steering column 10 having a steering wheel 11 mounted at one end and having the other end adapted for connection to a steering column drive connection (not shown). The steering column section 10 is of such length as projects from a vehicle instrument panel to within the vehicle operator's compartment. The steering wheel 11 may be deep dished, as shown, or of any other style, shape or configuration.

The steering column section 10 includes a pair of parallel spaced side links 12. The ends of the side links 12 are secured together by pivot pin connections 13. The pivot pin connections 13 include internally threaded sleeves 14. Angle braces 15 and connecting links 16 are received on the sleeves 14 between the side link members 12. Screws 17 and washers 18 are used to hold the parts 12, 15 and 16 together on the pivot pin sleeves 14.

The outwardly divergent flanges 19 of the angle braces 15 are for connection to the steering wheel 11, as shown, and to the steering drive connection at the other end (which is not shown).

Disposed in contiguous parallel relation to the side links 12, in the plane of the pivotally connected flanges of the angle braces 15, are a pair of intermediate or operator links 20. These links are in parallel spaced relation to each other and on opposite sides of the connecting links 16. The operator links 20 are pivotally engaged to the side links 12, at their centers, as will be described. They include elongated slots 22 at their ends which are aligned with elongated slots 23 in the connecting links 16, when the steering column 10 is extended or disposed for use.

A pivot pin 24 is received in the elongated slots 22 and 23 to hold the operator links 20 pivotally engaged to the connecting links 16. The outer side links 12 are disposed outwardly of the ends of the pivot pin members 24 to avoid interference therewith.

An operator cam 30 is mounted centrally between the ends of the links 20. The side links 12 and operator links 20 are formed to receive a pivot pin connection 31 therethrough. The pivot pin connection 31 is similar to the other pivot pin connectors 13. It includes an internally threaded sleeve member 32 with washers 33 and screws 34 engaging its ends. The heads of the screws 34 are disposed externally of the side links 12, as with the connections 13. The cam 30 is rotatably mounted on the pivot pin 31.

The operator cam 30 is formed to include a handle receiving neck portion 35 which extends below the underside of the steering column section 10. If desired, it could be disposed on the other side of the steering column. A handle 36 is engaged to the neck portion 35 for operation of the cam 30. The cam may be operated by power means, directly or through a mechanical linkage, if desired. However, for illustration purposes, the more simple, direct mechanical operation is shown.

The cam 30 is formed to include cam slots 38 near opposite side edges thereof and adjacent to the connecting links 16. The cam slots have a maximum radial spacing from the pivot pin 31 at their midpoint and on each side thereof are of progressively lesser radial spacing therefrom. The cam follower slots 38 are formed through the cam member 30 to guide toggle locks 40 which are engaged thereto.

The toggle locks 40 are U-shaped and have the leg portions received on opposite sides of the cam 30 (FIG. 5). They are connected thereto by a pivot pin 41 extending through the cam follower slots 38. A sleeve bushing 42 is disposed on the pins 41 between the legs of the toggle lock members. The ends of the toggle locks are tapered as at 43, and are engaged with the connecting links 16 within receiving slots 44 in the ends thereof.

The toggle lock members 40 are biased into link locking position by spring members 45 mounted on each side of the cam 30 and having their ends engaging the leg ends of the lock members. The biasing springs 45 are received on the pivot pin sleeve 32 and are formed to hold the cam plate 30 centered between the operator links 20.

The toggle lock members 40 are wider than the connecting links 16 and are received and guided within elongated slots 46 forward in the operator links 20. The slots 46 have a shape similar to the cross sectional shape of the lock members 40 but are longer to allow relative longitudinal movement therein. The side links 12 may serve as closing ends preventing axial and disengaging movement of the follower pins 41.

When the outside links 12 and operator links 20 are aligned, the steering column 10 is in position for use. The toggle locks 40 are held engaged to the links 16 to form a lock between the operator links 20 and the connecting links. Since the decrease in radial spacing of the cam slots causes retraction when the cam member 30 is rotated, as in FIG. 4, the toggle locks 40 are withdrawn from engagement with the links 16. This frees the operator links 20 and enables them, by means of the elongated slots 22 and 23, to assume the position illustrated in broken lines in FIG. 1 relative to the outside links 12. This will be described more fully in the description of the operation of the disclosed steering mechanism after mention is made of an alternate or modified structure.

Modification

The steering mechanism of FIGS. 7–12 includes a steering column 110 having a steering wheel 111 mounted at one end thereof. The other end of the steering column 110 is adapted for connection to a steering column drive connection, which is not shown. As with the steering column 10, the length of the column 110 is such as projects from the vehicle instrument panel to within the vehicle operator's compartment.

The steering column 110 includes side links 112 which, in this instance, are formed to include strengthening flanges about the edges and openings therethrough. The links 112 are disposed in parallel spaced relation to each other and are secured together, at their respective ends, by pivot pin connections 113. These pivotal connections include an internally threaded sleeve 114 having link forming plate members 116 received thereon and between the outer side link members 112. It will be recognized that while several plate members 116 are shown as making up the attachment to the steering wheel, a single casting or forging could be substituted for this assembly. Spacers 116' are also used on the sleeve pins 114. The outermost plates 116 are shown to include angular flanges 115 for attachment to the steering wheel 111 and the drive column (not shown). Screws 117 and washers 118 are used to hold the parts 112, 116 and 116' together as in assembly.

A pair of operator links 120, with respect to the side links 112, are engaged to the plates 116. A pivotal connection 121 is used and includes the same type of internally threaded pivot pin sleeve 122 utilizing screws 123 and washers 124 as does the connection 113. The links 120 seat against the external faces of the plates 116 and are disposed in the plane of the spacers 116' and slightly above the side links 112. This is best shown by FIG. 11.

The operator cam 130, the toggle locks 140, and related mechanism is substantially as previously described with respect to the other steering device. A pivot pin connection 131, formed by the sleeve pin 132 and with screws 133 and washers 134, rotatably holds the cam plate 130 between the side links 112. The toggle lock members 140 are engaged to the cam 130 by pins 141 received through the cam slots 138 in the cam member. The cam slots 138 have a maximum radial spacing from the pivot pin 131 at their midpoint and on each side thereof are of progressively lesser radial spacing therefrom. The wedge shaped locks 140 are biased in a locking position by the spring 145, just as in the other steering device.

The toggle locks 140 are wider than the members 116 and are received and guided within slots 146 formed in the side links 112. The cam follower pins 141 are prevented from lateral movement by sleeve bushings 142 pressed on the pins and disposed between the legs of the toggle locks 140, which bracket the cam plate. The guide slots 146 enable the locking members to have their tapered ends engaged with or disengaged from the lock receiving slots 144 in the ends of the toggle forming plates.

The guide slots 146 are of sufficient length to permit sliding movement of the locking members from locked to retracted position. The cam plate handle 136 serves to operate the cam 130 and to disengage the lock members 140 when desired.

The plates 116 are formed to include the lock receiving slots 144. These are aligned with the toggle lock 140 when the steering column is extended or disposed for use. They may also be designed to include a secondary slot 147 within which the locks 140 may be received to hold the mechanism in its raised position.

In the structure of FIGS. 7–12, the links 120 and the side links 112 form a locked parallelogram or pantograph when the toggle locks 140 are engaged in the slots 144 of the connecting plates 116. When the cam 130 is operated to withdraw the lock members 140, the straight line connection between the links 116 is temporarily disengaged and the links then are permitted relative pivotal movement. This enables the mechanism to assume the position illustrated in broken lines in FIG. 7. A more complete description of the operation of this and the other steering mechanism follows hereafter.

*Operation*

The steering mechanism and folding feature of the mechanism of FIGS. 1–6 operates as follows:

When the steering column 10 is in its extended position as illustrated in full lines in FIG. 1, it is disposed for use. The outside links 12 and the operator links 20 are aligned to provide a straight line drive connection from the steering wheel 11 to the steering column drive connection. The operator links 20 connect the links 16 which are at each end of the steering column 10. The connecting links 16 are held in alignment with the operator links 20 and with the outside links 12 by means of the toggle locks 40.

The toggle locks 40 are limited to guided axial movement relative to the operator links 20; being received, as they are, in the guide slots 46 of the operator links 20. Accordingly, when the slotted ends 44 of the links 16 are engaged by the locking members 40, they are prevented from pivoting on pins 24 out of the straight line disposition shown.

When the cam 30 is rotated by manipulation of the handle 36, the toggle locks 40 are withdrawn from engagement with links 16. The cam member 30 is rotated from the position shown by FIG. 3 to that shown by FIG. 4. It will be noted that the cam structure using identical slot structures at both ends permits the lock to be released by manipulation of the handle either toward or away from the operator. In so doing, the locking members 40 are retracted and are required to follow the guide slots 38. As the tapered ends 43 of the locking members 40 are withdrawn from the locking slots 44, in the links 16, the links 16 are released to pivot on their pivotal connectors 13.

To raise or fold back the steering column 10, a person is required only to operate the handle 36 to disengage the toggle lock members 40 and then to raise the steering wheel upwardly. The weight of the steering wheel 11 will cause the link member 16, nearest the steering wheel, to be pivoted on its pivotal connection 13 out of a locking position as soon as the toggle lock member 40 is withdrawn. Thereafter, application of an upward force at the lower side of the steering wheel 11 will cause the assembly to assume the retracted position illustrated in broken lines in FIG. 1. The pins 24 alide along the guide slots 22 toward the ends of the operator links 20 and thereby enable the effective length of the operator links 20 to be increased relative to that of the side links 12. Accordingly, as the side links 12 are pivoted about their lower pivotal connection 13, the steering wheel 11 is free to assume a more steeply inclined position than would otherwise be possible.

Referring to FIG. 6, the steering wheel 11 is shown in the position it would occupy if it were not for the elongated slots 23 in the links 20. This would cause the lower edge of the steering wheel to protrude objectionably. However, the elongated slots 23 enable the steering wheel connecting link 16 to pivot about the upper pivotal connection 13 at the outer end of the steering column assembly, and to move the pins 24 of both of the links 16 to the extreme ends of the slots. In so doing the steering wheel not only assumes the more vertical position shown by FIG. 1 but also is frictionally locked in its raised position.

The weight of the steering wheel 11 acts substantially axially through the outside links 12, and also as a force couple about the pivotal connection 13 at the upper ends of the links 12.

It will be noted from studying FIGS. 1 and 6 that as the steering wheel is pivoted downwardly to move the pins 24 to the ends of the slots 23, the steering wheel actually rotates about the outer or upper one of the pivot pins 13. As illustrated in FIG. 6, two identical triangles are formed, one having angles at the upper pivot pin 13, the upper pin 24 and the center pivot pin 31, the other having angles at the lower pivot pin 13, the lower pin 24 and the center pivot pin 31. As the steering wheel 11 is pivoted downwardly the upper pin 24 moves outwardly with respect to the link 12 because the pin 24 is moving in an arc having a fixed radius about the upper pivot pin 13. The result is a tight frictional bind between the upper pin 24 and the walls of the slot 23. The same occurs at the corresponding corner of the triangle below the center pivot pin 31.

Further, the weight of the steering wheel 11 biases the upper pin 24 upwardly due to the tendency of the upper links 16 to rotate about the upper pin 13. It is impossible for the link 20 to slide downwardly about the lower pin 24 because this cannot occur without corresponding downward movement of the upper pin 24 in the slot 23 at the upper end of the link 20. This is made necessary by reason of the arc of movement of the center pivot pin 31 as the scissors structure formed by the links 12 and 20 collapses. Such movement is positively resisted by the weight of the steering wheel 11. This keeps the pins 24 engaged at the extreme ends of the slots 23, in the inner links 20, and provides a frictional lock against inadvertent collapse of the steering assembly from its raised position.

A slight pull exerted on the lower side of the steering wheel 11 urging it away from the linkage releases this frictional lock and enables the pins 24 to move in slots 23. Once this has been done, the steering wheel 11 is easily and readily lowered into its operating position. Once in such position, the spring biased locking lugs 40 snap into the slotted ends of the links 16 locking the linkage in aligned relationship.

The folding steering mechanism of FIGS. 7–12 operates to some extent like the mechanism just described. However, the linkage has no inherent locking characteristics in retracted or raised position. The links 112 and 120 form a parallelogram or pantograph linkage. When the link members 116 are aligned with the side links 112, by the spring loaded toggle locks 140, the parallelogram linkages hold the steering column 110 disposed for use. This is shown by the full line drawing of the mechanism in FIG. 7.

When the toggle lock members 140 are retracted, by rotation of the cam member 130, the link members 116 are free to pivot independently of the side links 112. Thus, the steering column 110 may be raised to the outline position shown by FIG. 6. The use of the parallogram or pantograph linkage stabilizes the position of the steering wheel preventing it from pivoting about the upper pivot pin 113. It also maintains this angle as the steering column is extended and retracted.

In both of the steering devices 10 and 110 separate means may be employed to hold the steering columns in their elevated positions. Means may be incorporated within the vehicle instrument panel to grip and hold the devices up out of the way. A cover or shell about the mechanism may include some form of retractable lock to hold the steering column in retracted position as a substitute means may be incorporated within the devices themselves.

The mechanism of FIGS. 1–6 is shown to be self supporting in its elevated position. The mechanism of FIGS. 7–12 may also be made self supporting when the structure includes the secondary lock receiving slots 147 within the plate members 116. It will be noted that the shape of the face of the connecting links 116 is such that after the steering wheel has been raised slightly from its extended position, the locking mechanism can be released and will automatically engage the slot 147 when the wheel reaches its retracted position.

This invention provides a practical solution to the problem of providing adequate room for the entrance and exit of a driver in automobiles as currently designed. The invention incorporates necessary safety features by assuring a positive lock in both extended and retracted position. Thus, it will not inadvertently release or fold from extended position while the automobile is being operated. It requires very little effort to raise and lower. Even this can be reduced by the addition of a suitable biasing mechanism such as a spring to support and lift a portion of the weight of the steering wheel and associated linkage mechanism.

The structure of this invention can be enclosed within a shell to conceal its operating mechanism and give the steering column a neat and attractive appearance.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. A folding steering column, comprising: a pivotal link member having means of pivotal engagement with vehicle steering means at each end thereof, connecting members forming part of said vehicle steering means and disposed in spaced relation to each other, said connecting members having said pivotal link member engaged thereto and extending therebetween, and cam means operable on a reciprocal toggle locking means provided on said pivotal link member and selectively operative for engaging and disengaging said pivotal link member and connecting members in straight line drive engagement.

2. A folding steering column, comprising: a pair of parallel spaced pivotal link members having means of pivotal engagement with vehicle steering means at each end thereof, connecting members forming part of said vehicle steering means and disposed in spaced relation to each other, said connecting members having said pivotal link members engaged thereto and extending therebetween and cam means operable on a reciprocal toggle locking means mounted between said pivotal link members and selectively operative for engaging and disengaging said pivotal link members and connecting members in straight line engagement.

3. A folding steering column, comprising: a pair of parallel spaced pivotal link members having means of pivotal engagement with vehicle steering means at each end thereof, connecting members forming part of said vehicle steering means and disposed in spaced relation to each other, said connecting members having said pivotal link members engaged thereto and extending therebetween and cam means operable on a reciprocal toggle locking means mounted between said pivotal link members and selectively operative for engaging and disengaging said pivotal link members and connecting members in straight line drive engagement, said connecting members and pivotal link members including secondary locking means therebetween for temporarily holding said connecting members in non-aligned non-steering relation to each other following disengagement of said straight line connection and movement of said pivotal connecting links.

4. A folding steering column, comprising: connecting members forming part of said vehicle steering means and disposed in spaced relation to each other, pairs of parallel spaced pivotal link members extending between said connecting members and having the ends of respective pairs thereof pivotally engaged to said connecting members in spaced relation to each other, cam means operable on a toggle locking means operatively mounted between one of said pairs of pivotal link members, said toggle locking means being formed for locking engagement with said connecting members when aligned with each other and the pivotal link members between which said locking means are disposed, the other of said pair of pivotal link members providing a brace betwen said connecting members when disposed in aligned relation as last mentioned and otherwise providing a guiding restriction in combination with said first mentioned pair of pivotal link members to the movement available to said connecting members.

5. A folding steering column, comprising: a pair of connecting members forming part of a vehicle steering means and being disposed in spaced relation to each other, a pair of pivotal side link members extending between said connecting members and having their ends pivotally engaged thereto, cam means operable on a toggle locking means mounted between said pivotal link members and operatively engaged therewith, said toggle locking means including means of locking engagement with said connecting members when disposed in straight line steering connecting relation to each other, and an operator link member extending in parallel spaced relation to said pivotal link members and having opposite ends thereof connected to said connecting members at spaced locations from the connection of said pivotal link members therewith, said operator link forming a parallelogram linkage with said connecting and pivotal link members for directing and limiting the pivotal freedom of said connecting members relative to said pivotal link members when disengaged from said toggle locking means.

6. A folding steering column, comprising: connecting members for fixed engagement with vehicle steering means, a pair of parallel spaced pivotal connecting link members having their ends pivotally engaged to said connecting members at spaced distances from the ends thereof and being extended therebetween a cam groove slotted pivotal member mounted between said pivotal link members, toggle locking members engaged with the cam groove slots of said last mentioned member, toggle lock receiving guide slots formed in said pivotal link members for receiving said toggle locking members for reciprocal guided movement relative to the ends of said pivotal link members, and said connecting members having the ends thereof formed to receive said toggle locking members in locking engagement therewith when aligned with said pivotal link members.

7. A folding steering column, comprising: a pair of spaced connecting members having pivotal link members engaged thereto and extending therebetween, locking means mounted on one of said connecting and pivotal link members and disposed for locking engagement with the other thereof upon the straight line drive alignment of both together, a operator link having a pivotal pin connection with said connecting members and extending therebetween, and lost motion guide pin receiving slots formed within at least one of said operator link and connecting members for allowing increased freedom of relative pivotal movement therebetween and within the limitations imposed by said pivotal link members with respect to said operator link, said guide pin receiving slots as formed in said operator link being extended beyond what is required for folding said steering column to receive and frictionally hold the pivotal pin of said connection therein and said steering column in a folded disposition.

8. In a foldable section for a steering column, the combination comprising: a side link and a operator link; a steering wheel first terminal element and a steering column second terminal element; one end of said side link being pivotally secured to said first terminal element and the other end thereof being pivotally secured to said second terminal element; said operator link being pivotally secured to said side link at the midpoint thereof; slots adjacent both ends of said operator link, said slots being blind at both ends; a pin on each of said terminal elements one slidably received in each of said slots; said side and operator links being aligned when said foldable section is in extended position; said operator link being inclined to said side link when said foldable section is in retracted position; said pins forming a bind with the walls of said slots during the last portion of the movement of said foldable section from extended to retracted position; a steering wheel mounted on said first terminal element and biasing said first terminal element about said pivotal securement between said first terminal element and said side link and when said foldable section is in retracted position urging said pin on said first terminal element into binding engagement with the walls of its associated slot.

9. In a foldable section for a steering column, the combination comprising: a side link and a operator link; a steering wheel first terminal element and a steering column second terminal element; one end of each of said side and operator links being pivotally connected to said first terminal element, the other end of each of said side and operator links being pivotally connected to said second terminal element whereby said first terminal element can be shifted from an extended position aligned with said second terminal element and said steering column to a retracted position above said extended position; latch means for locking said foldable section in said extended position; said latch means being mounted to said side links intermediate the ends thereof; said first and second terminal elements each having a pair of spaced sockets; said latch means having retractable members adapted to enter and engage one of said sockets in each of said terminal elements when said foldable section is in said extended position and to enter and engage the other of said sockets in each of said terminal elements when said foldable section is in said retracted position.

References Cited in the file of this patent

UNITED STATES PATENTS

| | | |
|---|---|---|
| 1,098,301 | Prindle | May 26, 1914 |
| 1,237,489 | Douglass | Aug. 21, 1917 |
| 1,298,151 | Aiken | Mar. 25, 1919 |
| 1,378,478 | McMullen | May 17, 1921 |
| 1,543,047 | Behrsing et al. | June 23, 1925 |
| 2,512,240 | Tweden | June 20, 1950 |